United States Patent
Fiete et al.

[11] Patent Number: 6,023,056
[45] Date of Patent: Feb. 8, 2000

[54] SCENE-BASED AUTOFOCUS METHOD

[75] Inventors: Robert D. Fiete, Fairport; James A. Mooney, Penfield, both of N.Y.

[73] Assignee: Eastman Kodak Company, Rochester, N.Y.

[21] Appl. No.: 09/072,010

[22] Filed: May 4, 1998

[51] Int. Cl.[7] .................................................. G02B 7/04
[52] U.S. Cl. .................................... 250/201.7; 250/208.1; 348/349; 396/104
[58] Field of Search ............................... 250/201.6, 201.7, 250/208.1; 396/104, 111, 114, 116; 348/345, 349, 350, 356

[56] References Cited

U.S. PATENT DOCUMENTS

| | | | |
|---|---|---|---|
| 3,945,023 | 3/1976 | Stauffer | 396/125 |
| 4,494,849 | 1/1985 | Namba | 396/111 |
| 4,540,881 | 9/1985 | Hayashi et al. | 250/201.7 |
| 4,992,818 | 2/1991 | Karasaki et al. | 396/114 |
| 5,166,506 | 11/1992 | Fiete et al. | 250/201.7 |
| 5,432,331 | 7/1995 | Wertheimer | 250/201.7 |

*Primary Examiner*—Stephone Allen
*Attorney, Agent, or Firm*—Thomas H. Close

[57] ABSTRACT

In a method of determining focus in an image capture system of the type having an image sensor, optics for forming an image of a scene on the image sensor, and an image processor for determining the best focus, an image is acquired such that the focus of the image changes continuously, line by line, across the image. A plurality of edges above a predetermined magnitude are detected in the image and the sharpness of the detected edge is measured. The sharpest edge in each line of the image is determined and plotted versus the location of the line in the image. A curve is fit to the plot of sharpness versus location and the best focus of the imaging system is determined from the peak of the curve fit.

9 Claims, 5 Drawing Sheets
SCENE-BASED AUTOFOCUS METHOD

FIELD OF THE INVENTION

The invention relates generally to a method for determining the best focus of image capture systems, for example cameras, input scanners, or document copiers, and in particular to a system and method for determining focus in such systems.

BACKGROUND OF THE INVENTION

FIG. 1 illustrates an image capture system, such as a camera, having an imaging lens 10 with a focal length f and a detector 12. An object 14 at a distance $d_o$ in front of the camera will be properly focused at the detector 12 at a distance $d_i$ behind the lens if the relationship between $d_o$, $d_i$, and f is $$\frac{1}{d_o} + \frac{1}{d_i} = \frac{1}{f}. \quad (1)$$

If the camera-to-object distance changes to a distance $d_o + \delta_0$ in front of the camera, as illustrated in FIG. 2, then the image will be out of focus by a distance $\delta_i$ given by $$\delta_i = d_i \left( \frac{1}{\frac{d_i}{d_o} - \frac{d_i}{d_o - \delta_o} + 1} - 1 \right). \quad (2)$$

No adverse effect to the image quality will be perceived if $\delta_i$ is within the depth of focus of the image capture system, given by $$\delta_i' = \pm 2\lambda \left(\frac{f}{D}\right)^2, \quad (3)$$

where D is the entrance aperture diameter of the image capture system. The corresponding depth of field $\delta'_o$ is given by $$\delta_o' = \pm 2\lambda \left(\frac{d_o}{D}\right)^2, \quad (4)$$

hence objects within the range of $d_o + \delta_o$ will not appear out of focus.

The correct focus of an image capture system can change over time due to dynamic changes with the system, such as those caused by the thermal environment. When the camera-to-object distance changes more than $\delta'_o$ it is necessary to refocus the image capture system. Prior art methods and devices have been proposed for determining the system focus by evaluation of the sharpness of an image formed by the system. These scene-based methods generally compare the image sharpness of the same scene imaged at different focus positions. A challenge with scene-based autofocus methods is that it is difficult to separate changes in focus from normal changes in the scene. This problem can be solved by imaging the same scene multiple times at different focus settings to determine the best focus. One such method proposed in U.S. Pat. No. 5,166,506 uses beam splitters to image the scene onto a plurality of sensors. This method, however, requires additional optical elements and the beam splitters reduce the signal arriving at each sensor. Another method proposed in U.S. Pat. No. 5,432,331 uses a tilted array and the image is moved such that the same scene is imaged onto each line of the sensor. This method requires very precise scanning to ensure that the same scene is properly imaged onto each line of the sensor.

There is a need therefore for a scene-based autofocus method that does not require the same scene to be imaged multiple times to determine focus and does not require additional optical elements in the design of the image capture system.

SUMMARY OF THE INVENTION

The object of the present invention is to provide a method that determines the best focus of an image for an image capture system. The image capture system includes an image processor that determines the best focus position from the acquired image. According to the present invention, a method of determining focus in an image capture system of the type having an image sensor, optics for forming an image of a scene on the image sensor, and an image processor for determining the best focus, an image is acquired such that the focus of the image changes continuously, line by line, across the image. A plurality of edges above a predetermined magnitude are detected in the image and the sharpness of the detected edges is measured. The sharpest edge in each line of the image is determined and the sharpness is plotted versus the location of the line in the image. A curve is fit to the plot of sharpness versus location and the best focus of the imaging system is determined from the peak of the curve fit.

ADVANTAGEOUS EFFECT OF THE INVENTION

This invention allows the focus of an image capture system to be determined by acquiring a single image of a scene.

DETAILED DESCRIPTION OF THE INVENTION

Figure 1:
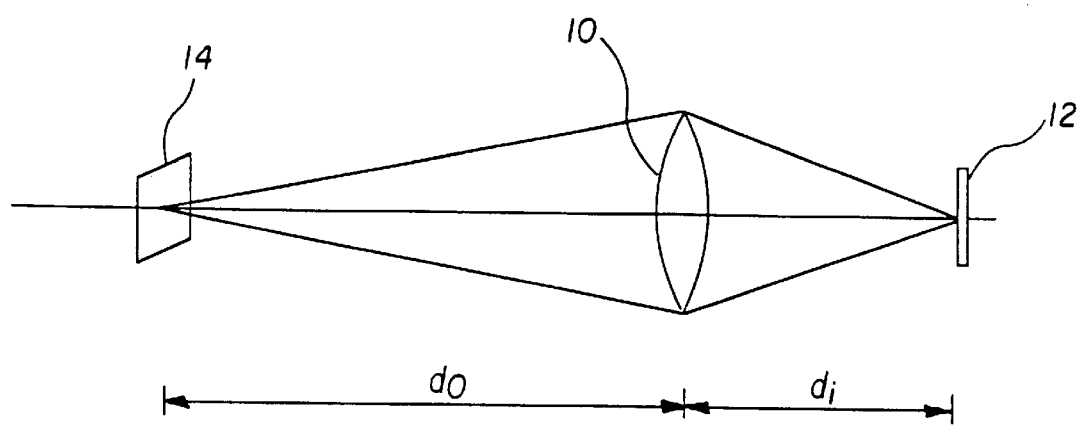
FIGS. 1 and 2 are schematic diagrams of an imaging system useful in describing the background of the present invention, showing the imaging system in and out of focus respectively.
Figure 2:
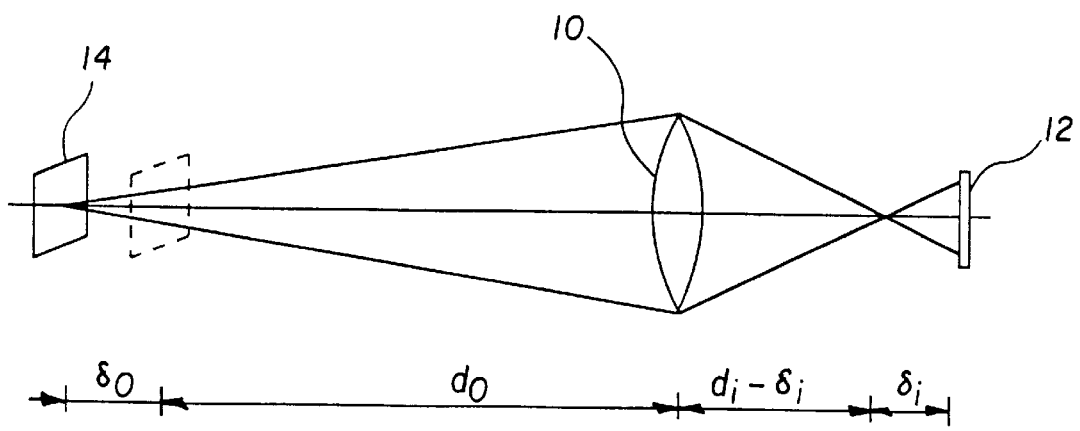
Figure 3:
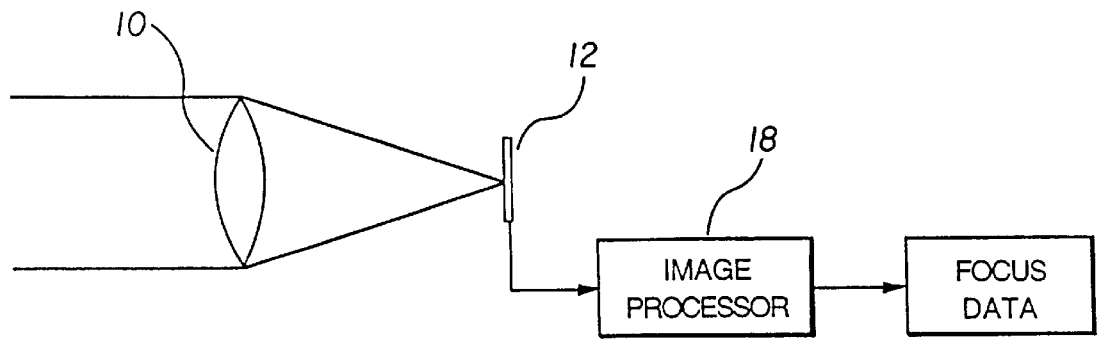
FIG. 3 is a schematic diagram of a focus detecting system according to the present invention.

Referring to FIG. 3, a focus detecting system according to the present invention includes an image capture system, including imaging optics 10, an image sensor 12, and an image processor 18 used to determine the best focus. The method for determining the best focus in the present invention requires the image capture system to acquire a focus calibration image, $i_{fc}(x,y)$. The focus calibration image $i_{fc}(x,y)$ is an image of a typical scene except that the focus of the image capture system is changed, line by line, in one direction throughout the image. The direction of the changing focus in the image will be denoted as the x direction. The range of defocus represented in the focus calibration image $i_{fc}(x,y)$ should span a range much greater (e.g. 4 times greater) than the depth of focus of the image capture system, defined in EQ. 3 above.

Figure 4:
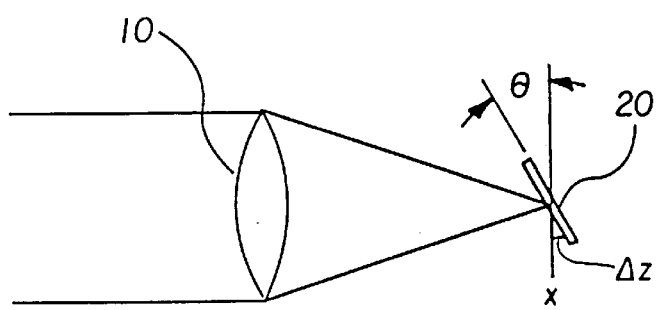
FIG. 4 illustrates generating a focus calibration image by tilting a two-dimensional image sensor array.

For a linear detector array, where the array is scanned relative to the image of the scene during image capture, the focus calibration image $i_{fc}(x,y)$ is captured by translating the imaging sensor 12 along the optical axis as each line of image data is acquired or by modifying the effective focal length of the lens 10 as the image is acquired. A shown in FIG. 4, for a two-dimensional image sensor 20 the focus calibration image can be captured by tilting the two dimensional image sensor 20 at an angle θ with respect to the optical axis of the lens 10. The translation Δz of the image plane for any given line in the image sensor 20 is given by $$\Delta z = x \sin \theta. \quad (5)$$

This arrangement of using a tilted array to change the focus of an image is shown in U.S. Pat. No. 5,432,331, but the present method of determining best focus differs from that shown in the '331 patent, which requires the same sub-image to be imaged onto each line of the detector such that the scene contained in the sub-image is acquired over a range of focus. The method of the present invention does not require the same sub-image to be imaged onto each line of the detector.

A Δz defocus list is generated during the acquisition of the focus calibration image $i_{fc}(x,y)$ and stored in image processor 18. The defocus list records the translation Δz of the focal plane for each line x of image data in $i_{fc}(x,y)$. This is necessary so that each line x of image data can later be referenced to the corresponding focal plane position Δz.

Figure 5:
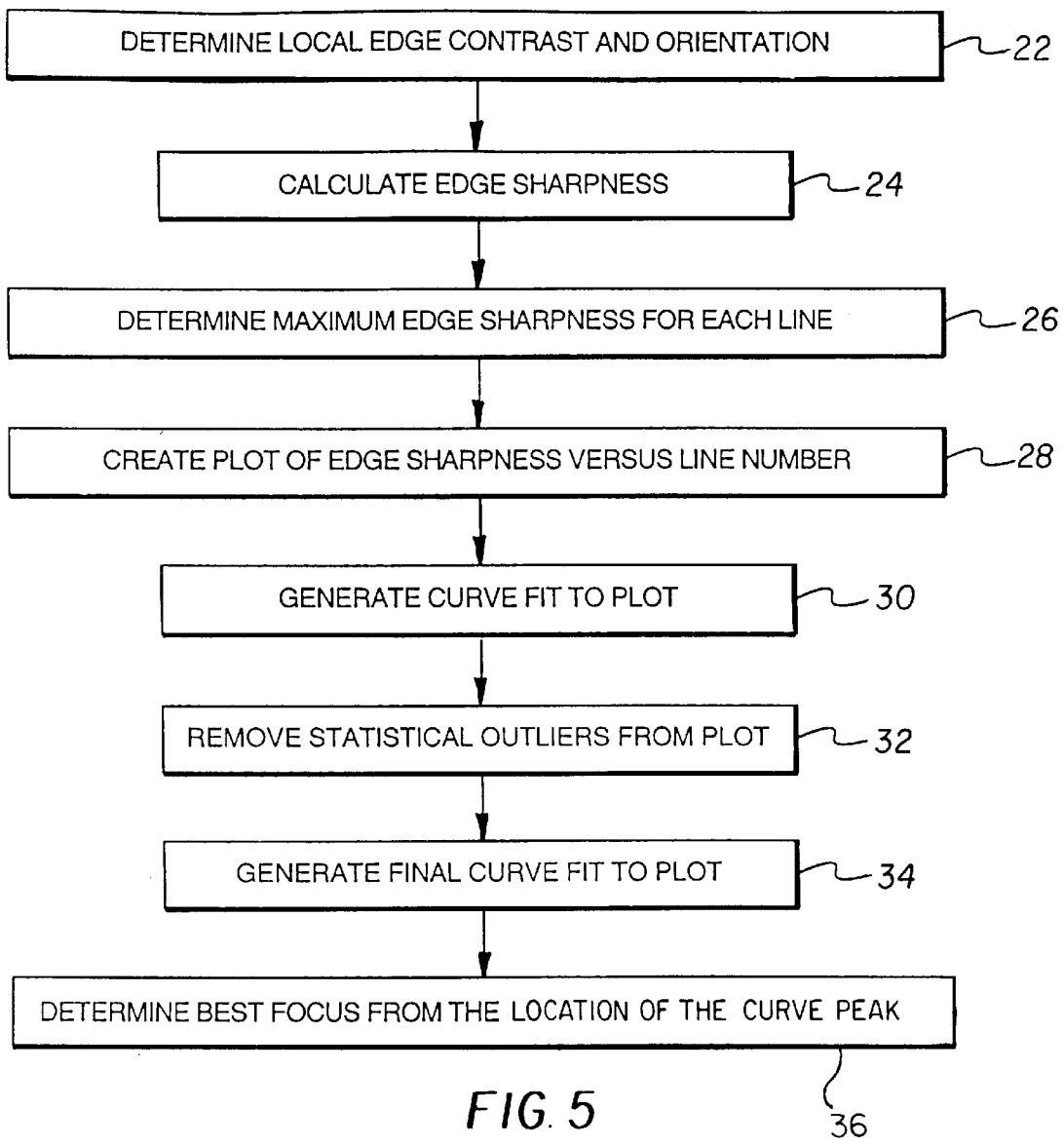
FIG. 5 shows the image processing steps for determining the best focus.
Figure 6:
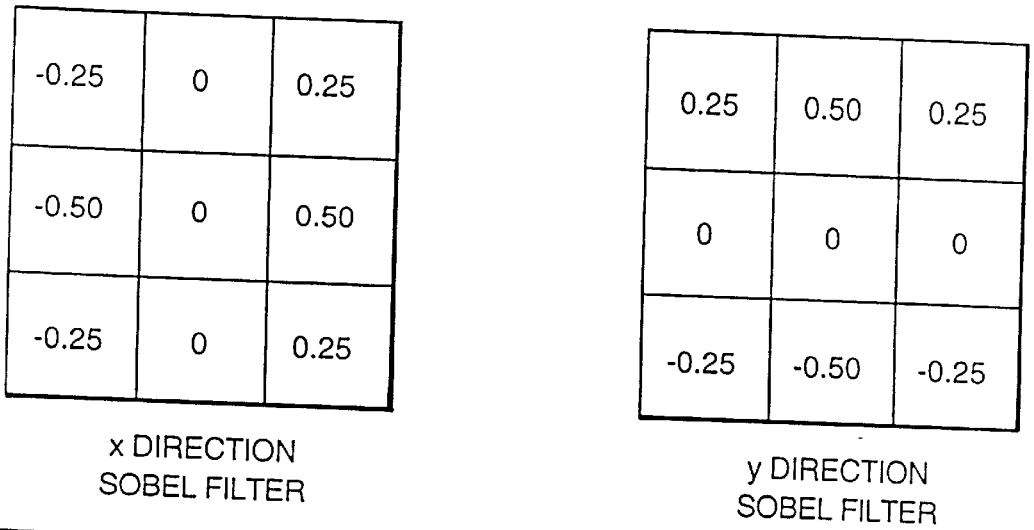
FIG. 6 is the Sobel filters used for determining the edge magnitude and orientation.

The image processor 18 in FIG. 3 processes the focus calibration image $i_{fc}(x,y)$ to determine the Δz for best focus. The flow diagram for the image processor 18 is shown in FIG. 5. The focus calibration image $i_{fc}(x,y)$ is first processed 22 with edge filters to determine the contrast and orientation of the edges in the image. FIG. 6 shows Sobel filters, $S_x(x,y)$ and $S_y(x,y)$, which are used in the preferred embodiment of the invention to measure the edge magnitude and orientation. The magnitude of the edge in the x direction at the pixel location x,y is given by $$E_x(x, y) = \sum_{m=-1}^{1} \sum_{n=-1}^{1} S_x(x-m, y-n) i_{fc}(x-m, y-n), \quad (6)$$

and the magnitude of the edge in the y direction at the pixel location x,y is given by $$E_y(x, y) = \sum_{m=-1}^{1} \sum_{n=-1}^{1} S_y(x-m, y-n) i_{fc}(x-m, y-n). \quad (7)$$

The overall edge magnitude is given by $$M(x, y) = \sqrt{E_x(x, y)^2 + E_y(x, y)^2}, \quad (8)$$

and the edge orientation is given by $$\theta(x, y) = \tan^{-1}\left[\frac{E_y(x, y)}{E_x(x, y)}\right]. \quad (9)$$

Next an edge correlation metric C(x,y) is generated 24 from $i_{fc}(x,y)$ to determine how well each edge in $i_{fc}(x,y)$ correlates with a perfect edge. The edge correlation metric C(x,y) measures the "sharpness" of the edge, i.e. how quickly the edge transitions from one gray level to another. In order to speed up the processing, only the pixel locations with edge magnitudes M(x,y) greater than a predetermined threshold $M_T$ are processed; C(x,y) is set to zero for all other pixel locations. If $M(x,y) > M_T$ then an N×N sub-image, e.g. 12 pixels by 12 pixels, of $i_{fc}(x,y)$, centered on location x,y, is scaled such that the minimum gray-level $GL_{min}$ in the sub-image is set to zero and the maximum gray-level $GL_{max}$ in the sub-image is set to unity. Hence the scaled N×N sub-image $i'_{fc}(x,y)$ is given by $$i'_{fc}(x, y) = \frac{i_{fc}(x, y) - GL_{max}}{GL_{max} - GL_{min}}. \quad (10)$$

The local edge contrast EC(x,y) is calculated by $$EC(x, y) = \frac{GL_{max} - GL_{min}}{GL_{max} + GL_{min}}. \quad (11)$$

If EC(x,y) is less than a predetermined threshold $EC_T$ then the edge contrast is not sufficient for an accurate edge correlation measure and C(x,y) is set to zero. If $EC(x,y) > EC_T$ then C(x,y) is calculated using a metric that compares the local edge at x,y to a perfect edge. The edge correlation metric used in the preferred embodiment of the invention is given by $$C(x, y) = \sum_{m=-N/2}^{N/2} \sum_{n=-N/2}^{N/2} \frac{1}{[i'_{fc}(x-m, y-n) - STEP_\theta(x-m, y-n)]^2}, \quad (12)$$

where $STEP_\theta(x,y)$ is defined as:

$$STEP_\theta(x, y) = \begin{cases} 1.0 & \text{if } x\cos\theta + y\sin\theta > 0 \\ 0.5 & \text{if } x\cos\theta + y\sin\theta = 0 \\ 0.0 & \text{if } x\cos\theta + y\sin\theta < 0 \end{cases} \quad (13)$$

This edge correlation metric measures the deviation of a blurred edge 38 in the image from a perfect edge 40 defined by $STEP_{74}$ (x,y), as shown in FIG. 6.

Figure 7:
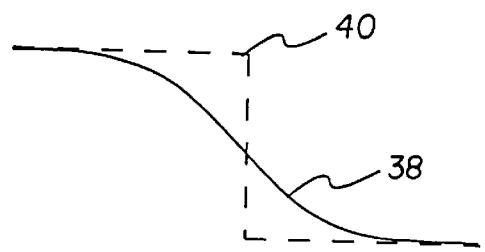
FIG. 7 compares a blurred edge with a perfect edge.
Figure 8:
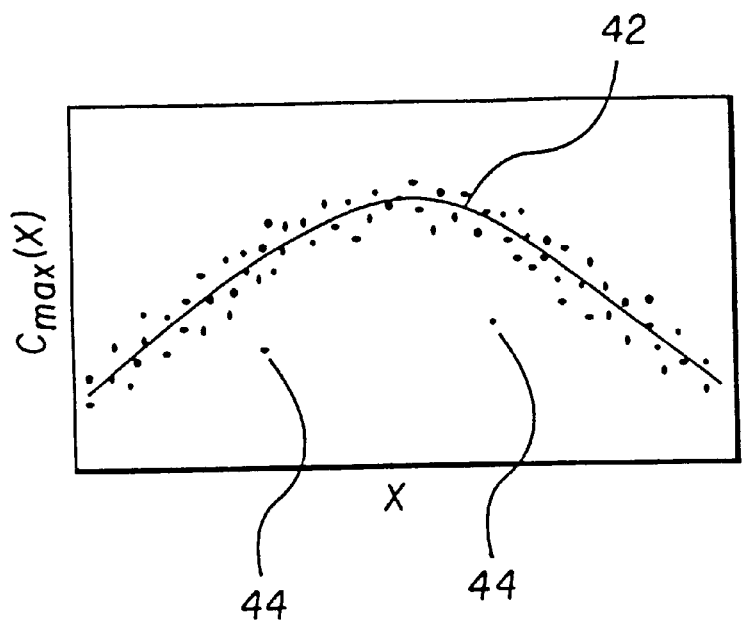
FIG. 8 illustrates the plot of $C_{max}(x)$ as a function of x with the initial curve fit.

The maximum edge correlation value $C_{max}(x)$ (i.e. the sharpest edge) for each line x of C(x,y) is determined 26 and $C_{max}(x)$ is plotted 28 as a function of x. If $C_{max}(x)=0$, the data point is removed from further analysis. Next a curve 42 is fit 30 to the plot of $C_{max}(x)$ as a function of x, as illustrated in FIG. 7. In the preferred embodiment of the invention a fifth order polynomial is used to fit the curve 42 to the plot.

A statistical analysis is performed to remove 32 statistical outlier data points 44 from further analysis. The statistical outliers 44 will be defined as points lying outside a boundary that is dependent on the standard error of estimate $s_e$, given by $$s_e = \sqrt{\frac{\sum_{x=1}^{k}[C_{\max}(x) - \hat{C}_{\max}(x)]^2}{k-2}}, \quad (14)$$

where $\hat{C}_{max}(x)$ is the curve fit 42 to $C_{max}(x)$ and k is the total number of data points. Values of $C_{max}(x)$ that satisfy the condition $|C_{max}(x) - \hat{C}_{max}(x)| < T_s$ are determined to be outliers. The outlier threshold $T_s$ is proportional to $s_e$ and is typically set equal to $3s_e$.

Figure 9:
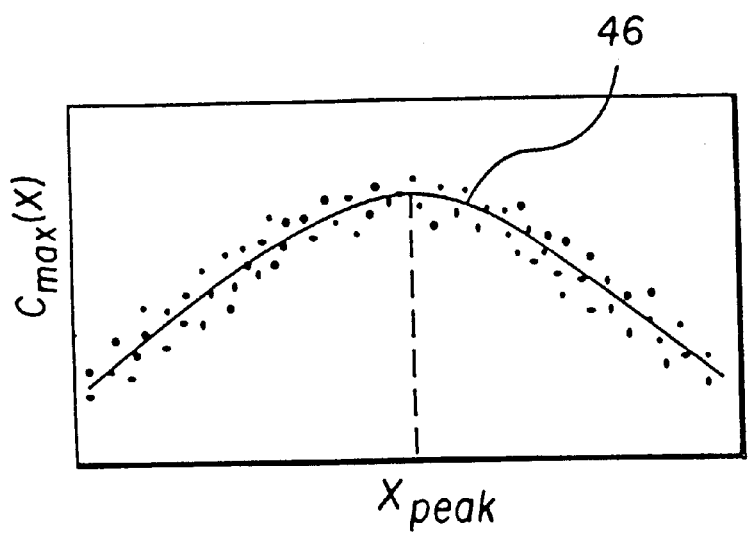
FIG. 9 illustrates the plot of $C_{max}(x)$ as a function of x with the final curve fit.

The statistical outliers are removed from the plot and a new curve 46 is fit 34 to the plot, as illustrated in FIG. 9. The value $x_{peak}$ of x that corresponds to the peak of the curve 46 is determined 36. The focus position $\Delta z$ that results in the sharpest image quality, hence the best focus, is the $\Delta z$ that corresponds to $x_{peak}$ using the $\Delta z$ reference list.

The method of determining focus according to the present invention was applied to an image capture system designed for remote imaging and compared to prior art methods of determining best focus. The method of the present invention proved more easily implemented than the methods of the prior art, and was consistently capable of determining best focus. The method proved surprisingly robust across different type of scenes, even for scenes that did not appear to contain a great deal of edge information.

The invention has been described with reference to a preferred embodiment. However, it will be appreciated that variations and modifications can be effected by a person of ordinary skill in the art without departing from the scope of the invention.

PARTS LIST

10 imaging optics
12 imaging sensor
14 object in scene
18 image processor
20 tilted imaging array
22 determine local edge contrast and orientation step
24 determine edge correlation step
26 determine maximum edge correlation step
28 create plot step
30 generate curve fit step
32 remove outliers step
34 generate final curve fit step
36 determine best focus step
38 blurred edge
40 perfect edge
42 initial curve fit to edge correlation data
44 data outliers
46 final curve fit to edge correlation data

We claim:

1. A method of determining focus in an image capture system of the type having an image sensor, optics for forming an image of a scene on the image sensor, and an image processor for determining the best focus, comprising the steps of:
   a) acquiring an image such that the focus of the image changes continuously, line by line, across the image;
   b) detecting a plurality of edges in the image that are above a predetermined magnitude;
   c) measuring the sharpness of the detected edges;
   d) detecting sharpness of the sharpest edge in each line of the image;
   e) plotting the sharpness of the sharpest edge in each line versus the location of the line in the image;
   f) fitting a curve to the plot of sharpness versus location; and
   g) determining the best focus of the imaging system from the peak of the curve fit.

2. The method of determining focus claimed in claim 1, wherein the edges are detected by a Sobel edge detector.

3. The method of determining focus claimed in claim 1, further comprising the step of eliminating the outlying edge sharpness values prior to fitting the curve to the plot of sharpness versus location.

4. The method of determining focus claimed in claim 1, wherein the image capture system is a remote sensing system.

5. The method of determining focus claimed in claim 1, wherein the image capture system is in an input scanner.

6. The method of determining focus claimed in claim 1, wherein the image capture system is in a document copier.

7. The method of determining focus claimed in claim 1, wherein the image sensing member is photographic film.

8. The method of determining focus claimed in claim 1, wherein the image sensor is a solid state image sensor.

9. The method of determining focus claimed in claim 1, wherein the sharpness of the detected edges is measured by the following equation:

$$C(x, y) = \sum_{m=-N/2}^{N/2} \sum_{n=-N/2}^{N/2} \frac{1}{[i'_{fc}(x-m, y-n) - STEP_\theta(x-m, y-n)]^2}.$$

\* \* \* \* \*